United States Patent
Kashyap

(10) Patent No.: US 8,656,412 B2
(45) Date of Patent: Feb. 18, 2014

(54) PIPELINE ACROSS ISOLATED COMPUTING ENVIRONMENTS

(75) Inventor: Vivek Kashyap, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/647,418

(22) Filed: Dec. 25, 2009

(65) Prior Publication Data

US 2011/0161988 A1    Jun. 30, 2011

(51) Int. Cl.
  *G06F 9/44*    (2006.01)
  *H04L 29/06*   (2006.01)

(52) U.S. Cl.
  USPC ............................................. 719/319; 713/164

(58) Field of Classification Search
  USPC ............................................. 713/164; 719/319
  See application file for complete search history.

(56) References Cited

U.S. PATENT DOCUMENTS

| | | | |
|---|---|---|---|
| 5,682,534 A | 10/1997 | Kapoor et al. | |
| 6,044,379 A | 3/2000 | Callsen | |
| 6,751,646 B1 | 6/2004 | Chow et al. | |
| 7,096,475 B2 | 8/2006 | Leyfer et al. | |
| 7,293,200 B2 * | 11/2007 | Neary et al. | 714/35 |
| 7,389,512 B2 * | 6/2008 | Tucker | 719/313 |
| 8,056,119 B2 * | 11/2011 | Gillet et al. | 726/2 |
| 2007/0134070 A1 | 6/2007 | Smith et al. | |
| 2007/0244962 A1 * | 10/2007 | Laadan et al. | 709/201 |
| 2007/0256073 A1 | 11/2007 | Troung et al. | |
| 2008/0209025 A1 * | 8/2008 | Agetsuma et al. | 709/223 |

FOREIGN PATENT DOCUMENTS

EP    709994 A2    5/1996

OTHER PUBLICATIONS

Lewis et al., "Support for Extensibility and Site Autonomy in the Legion Grid System Object Model," Journal of Parallel and Distributed Computing, 2003.
Soltesz et al., "Virtual Doppelganger: On the Performance, Isolation, and Scalability of Para- and Paene- Virtualized Systems," 2006.

* cited by examiner

*Primary Examiner* — Charles E Anya
(74) *Attorney, Agent, or Firm* — Lieberman & Brandsdorfer, LLC

(57) ABSTRACT

Sharing resources in a computer system. An operating system within the computer system, the operating system having a kernel level and a user level, with the kernel level configured with a first container and a second container. The first container is assigned to a first namespace and the second container is assigned to a second namespace. Both the first and second namespaces are isolated from each other and at the same time in communication with at least one shared object. Communication across the containers is created through a socket in the namespace of the shared object of one or both of the containers. In addition, a conduit is formed between the containers by connecting the container absent the created socket to the container with the socket.

12 Claims, 4 Drawing Sheets

PIPELINE ACROSS ISOLATED COMPUTING ENVIRONMENTS

BACKGROUND OF THE INVENTION

1. Technical Field

This invention relates to an operating system kernel configured with independent isolated environments that appear as virtual machines within the operating system. More specifically, the invention relates to modifying the kernel to support sharing of resource between the isolated environments.

2. Description of the Prior Art

An operating system is a collection of system programs that control the overall operation of a computer system. The operating system may include an operating system container, on a physical computer, logical or physical partition, or a virtual machine hypervisor. In an operating system, containers effectively partition resources managed by a single operating system into isolated groups to balance conflicting demands on resource usage between the isolated groups. Containers can run instructions native to the core CPU without any special interpretation mechanisms. By providing a way to create and enter containers, an operating system gives applications the illusion of running on a separate machine while at the same time sharing many of the underlying resources. For example, the page cache of common files may effectively be shared because all containers use the same kernel and, depending on the container configuration, frequent the same library. This sharing can often extend to other files in directories that do not need to be written to. The savings realized by sharing these resources, while also providing isolation, mean that containers have significantly lower overhead than true virtualization.

A Container is built around the concept of a namespace, which is a feature of the kernel that allows different processes to have different views of the file system mounts, network, process, inter-process communication (shared memory, message queues, pipes) or other subsystems. A subsystem object identifier is present and is searchable in a particular instance of the namespace, thereby the same identifier may be used in another namespace without conflict. In effect a namespace allows multiple instances of the same subsystem identifier to exist on the same operating system. Each type of subsystem identifier therefore defines a separate namespace type. This enables a task to be associated with specific namespaces and thereby confine its access to specific objects while other tasks may similarly exist in other namespaces. The namespace encapsulates kernel variables to ensure that they will not interfere with commands and variables of other namespaces. In practicality, namespaces are dynamic in that you can add and delete objects at any time. The namespace has a hierarchy, including parent namespace, children namespace, etc. The separation and isolation of namespaces prevents sharing of resources. In other words, in order for processes to share resources, they must be in the same namespace. At the same time, the isolation of the namespace prevents efficient communication. The processes must communicate over the network to break the isolation.

There is a parallel jobs scheduling system in the art that allows users to run more jobs in less time by matching each job's processing needs and priority within the available resources, thereby maximizing resource utilization. However, for an operating system employing containers, a task within a container is bounding within the associated namespace. FIG. 1 is a flow chart (100) illustrating a prior art process for establishing a communication connection across containers. As shown, a first container is created with a first isolated namespace (102), and a first socket, in listening mode to accept connections, is created in that namespace (104). A socket is a software object that connects an application to a network protocol. For example, in an UNIX operating system environment, a program can send and receive TCP/IP messages by opening a socket and reading and writing data to and from the socket. Following the creation of the socket at step (104), a second container is created with a second isolated namespace (106). A second socket is created in the second namespace (108) and the second container requests a connection to the first socket (110) created at step (104). As shown, a socket exists on both sides of the connection, with one socket configured in a LISTEN mode to accept a connection, and the second socket to solicit the connection. However, the operating system blocks the second container from discovering the previously created socket because this socket is in the namespace of the first container. More specifically, there is a failure (112) of the connection request of the second container due to the separation of the network namespaces. Accordingly, the connection request of the second container fails.

As demonstrated in FIG. 1, different containers having different isolated namespaces cannot share a socket. More specifically, there is no cross-container communication support in the prior art, which mitigates efficiency of resource utilization. Accordingly, there is a need for a mechanism that supports parallel jobs scheduling that enables cross container communication.

SUMMARY OF THE INVENTION

This invention comprises a system and apparatus to enable sharing of resources in a computing environment configured with isolated user namespaces.

In one aspect of the invention, a computer system is provided with an operating system having a kernel level and a user level. The kernel level of the operating system is configured with a first container and a second container. A namespace manager is provided to assign a first set of namespaces to the first container and to assign a second set of namespaces to the second container. The first namespace set is isolated from the second namespace set, with one namespace shared across the containers. The first or second namespace has an object that is accessible across the shared namespace. A socket manager is provided to create a socket in the shared namespace. In addition, a cross communication manager is provided to create a conduit between the containers. The conduit is formed across a boundary between the first and second namespace by a connection of the container that does not have the created socket with a connection to the container with the socket.

In yet another aspect of the invention, an article is provided with a computer system with an operating system in communication with shared resources, and at least a first container and a second container configured within the kernel level of the operating system. The article also includes a computer-readable carrier having computer program instructions to manage cross container communication. Instructions are provided to assign the first container to a first set of namespaces and to assign the second container to a second set of namespaces, with the first namespace set being isolated from the second namespace set. In addition, one of the first or second namespaces has at least one shared object that is accessible across the shared namespace. Instructions are also provided to support a communication across a boundary of the first and second containers. The support instructions include creation of a socket in the shared namespace. Creation of the socket enables a conduit to be formed between the containers across the boundary through a connection of the container absent the socket to the container with the socket. The conduit supports access between the containers to shared resources.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Figure 1:
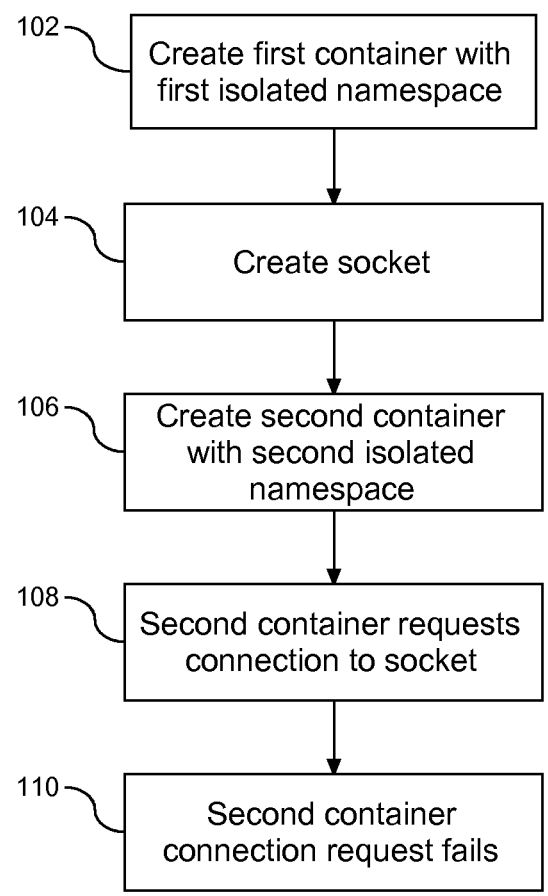
FIG. 1 is a prior art flow chart illustrating a process for establishing a communication connection across containers.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The manager may also be implemented in software for execution by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the manager and achieve the stated purpose of the manager.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of recovery manager, authentication module, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

A mechanism is employed to support sharing of resources between containers, while maintaining isolation of the container namespace. This mechanism is a communication conduit which is consistent with the namespace while maintaining isolation of the namespace. The conduit enables at least one namespace between two isolated containers to be shared. In one embodiment, the conduit is limited to the two containers or namespaces, while other objects in the same namespace or among other containers remain isolated. This contradiction of the namespaces, brought on by the object (socket) being in a shared filesystem namespace but not in the Inter-Process Communication (IPC) (networking or pipe) namespace, creates a semantic inconsistency in the namespace which normally would fail the connection. This invention instead utilizes the existence of shared namespace to enable cross-container communication in IPC namespace.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing form the scope of the present invention.

Figure 2:
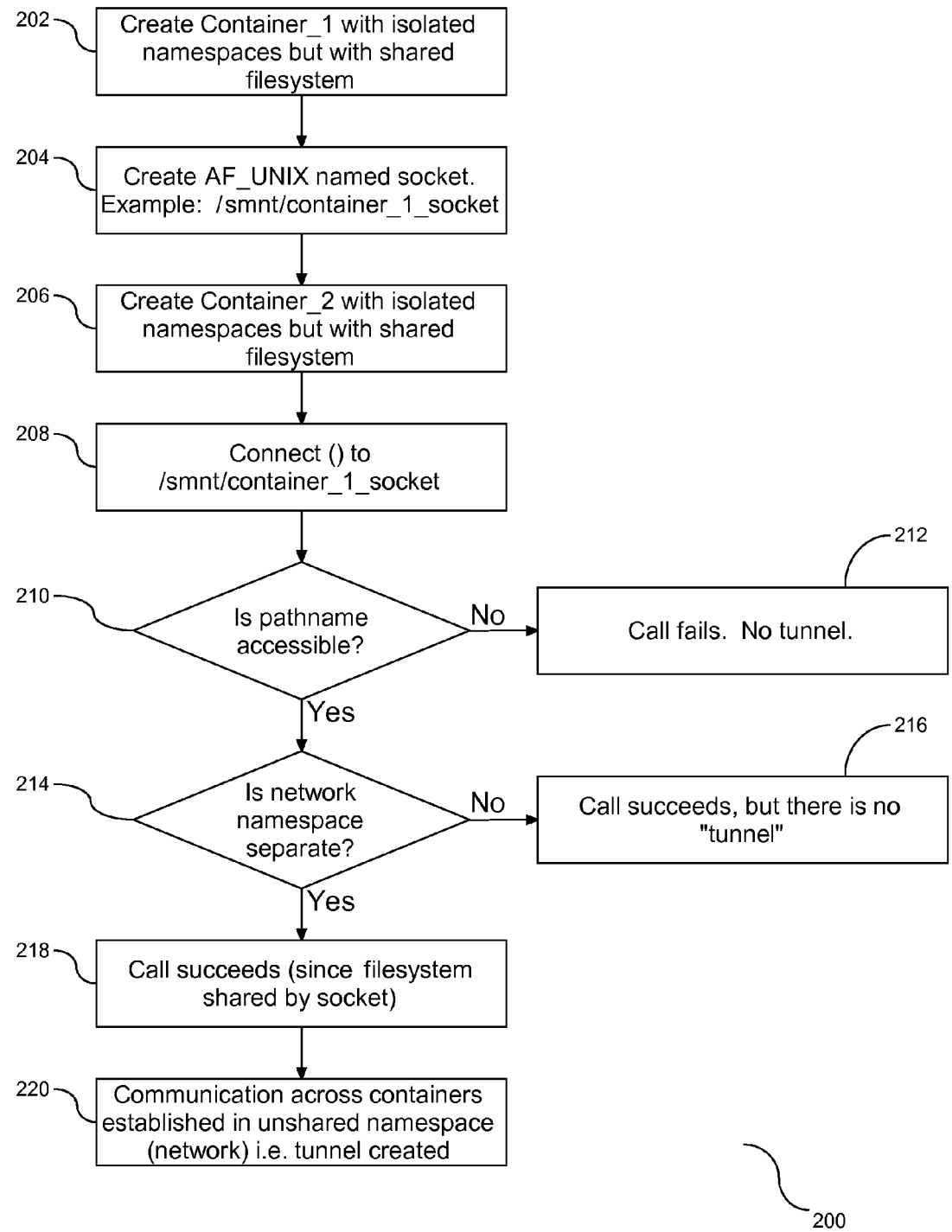
FIG. 2 is a flow chart illustrating a first embodiment for creation of a conduit to support cross-container communication.

A conduit may be created across namespaces by enabling sharing of a filesystem namespace. More specifically, the conduit may be created in the shared file namespace as a semantic inconsistency. FIG. 2 is a flow chart (200) illustrating one solution for creation of a conduit to support cross-container communication. More specifically, the conduit supports access to shared resources between the first and second containers. Initially, a first container is created and assigned to a set of isolated namespaces and with a shared file system (202). Following the creation at step (202) a first socket is created for the first container (204). In addition, following the creation of the first container, a second container is created and assigned to a set of isolated namespaces and a shared file system (206). To support cross-container communication, a connection is requested from the second container to the socket of the first container (208). In order to establish the connection, it is determined if the pathname of the first socket is accessible to the second container (210). A negative response to the determination at step (210) indicates that the connection establishment failed (212). Conversely, a positive response to the determination at step (210) is followed by determining whether the network namespace of the second container is separate from that of the first container (214). Similar to the determination at step (210), a negative response to the determination at step (214) does not create a connection across the containers (216). However, a positive response to the determination at step (214) is followed by completion of the connection request (218). The basis for the completion is based upon the file system of the first and second containers being shared by the socket created for the first container at step (204). In response to the completion of the connection request, communication across the first and second containers is established in an unshared namespace (220). In one embodiment, the established connection is considered a tunnel between the containers. Accordingly, by establishing the separate containers with respective isolated namespaces on a shared file system, a conduit is created to support cross container communication.

Figure 3:
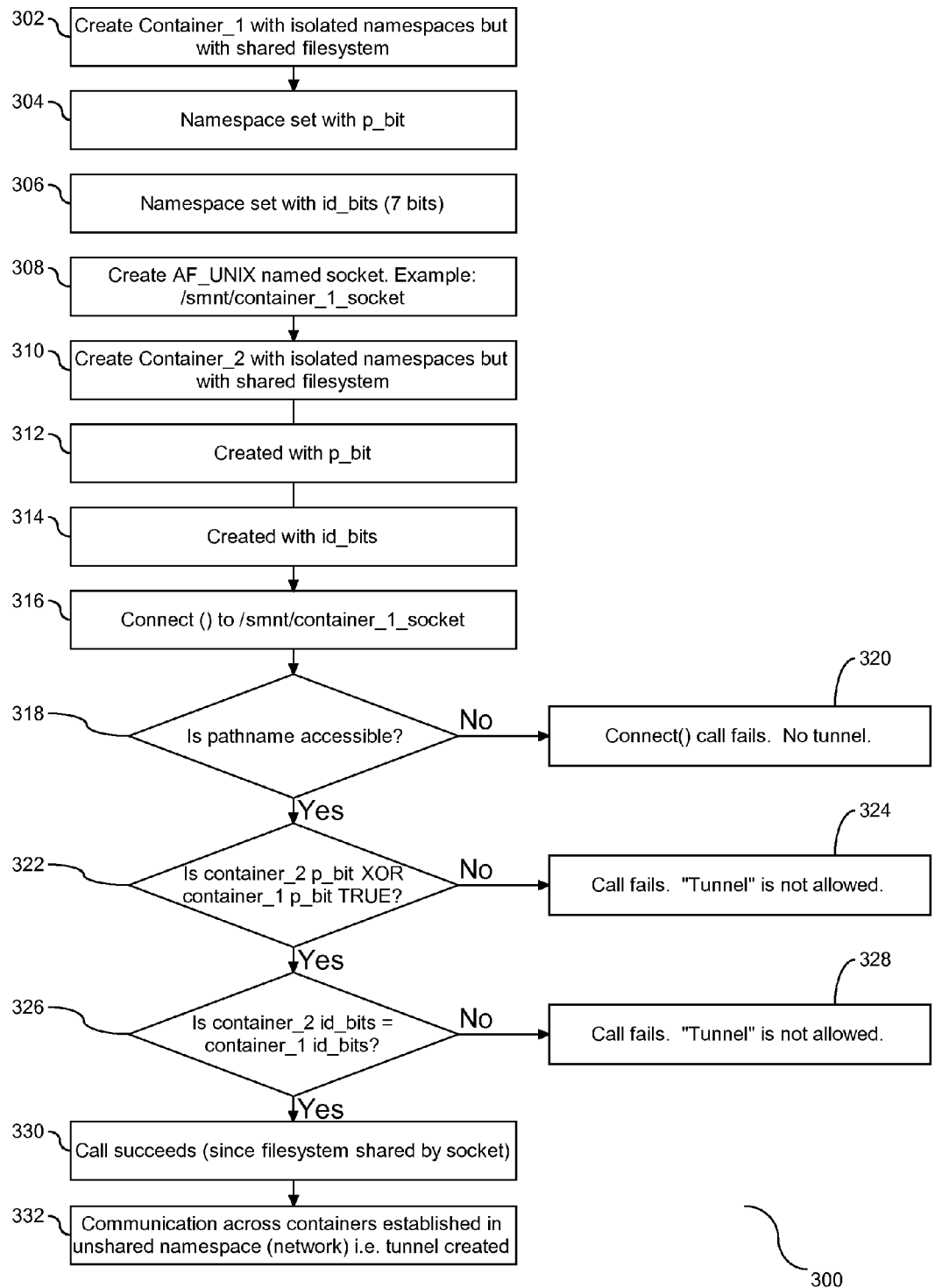
FIG. 3 is a flow chart illustrating a second embodiment for creation and maintenance of a conduit to support cross-container communication.

As shown in FIG. 2, the conduit crosses the namespaces through an underlying shared object of the two namespaces. However, the creation of the conduit as demonstrated may not always be accepted, such as when the filesystem is not shared. FIG. 3 is a flow chart (300) illustrating a second solution to support cross-container communication that employs tools for the creation and maintenance of a conduit. Initially, a first container is created with a set of isolated namespaces and with a shared file system (302). Following the creation at step (302), two flags are set for the first container, including a permission flag (304) and an identifier flag (306). Once the flags are set, a first socket is created for the first container (308). Accordingly, the creation of the first container with a shared file system includes both creation of a socket for the container and setting of at least two flags for the container.

In addition to creating a first container, a second container is created with a set of isolated namespaces and with a shared file system (310). Following the creation of the second container at step (310), two flags are set for the second container, including a permission flag (312) and an identifier flag (314). To support cross-container communication, a connection is requested from the second container to the socket of the first container (316). In order to establish the connection, it is determined if the pathname of the first socket is accessible to the second container (318). More specifically, in one embodiment, it is determined if a socket by the same name exists and is visible in the shared filesystem. A negative response to the determination at step (318) indicates that the connection establishment failed (320). In one embodiment, the connection failure emanates from the absence of the socket in the shared filesystem. Conversely, a positive response to the determination at step (318) is followed by determining whether the permission flag of the second container for either one of the first or second containers is set to a first position (322). In one embodiment, a Boolean operator may be employed for the determination at step (322), including but not limited to an exclusive OR operator. This operator returns a value of true only if just one of its operands is set to TRUE. For example, in one embodiment the permission flag of the containers has two settings, true and false. If neither one of the permission flags of either container are set to true, i.e. the first position, the cross connection between the first and second containers fails (324). In contrast, if either one of the permission flags of either container is set to true, i.e. the first position, it is then determined if the identifier flag of the second container has the same setting as the identifier flag of the first container (326). More specifically, the permission bit is a setting that indicates whether one container may create a conduit to a second container. A negative response to the determination at step (326) results in the failure of establishing the cross connection between the first and second containers (328). Conversely, a positive response to the determination at step (326) is followed by a successful completion of the connection request (330). The basis for the completion is based upon the file system of the first and second containers being shared by the socket created for the first container at step (308). The employment of the permission bit is employed to control the direction of the conduit established. In one embodiment, the containers may be organized in a hierarchical organization and the parent container may set the permission flag for itself but not set the flag for its children. This enables control of the conduit on the container with the set permission flag. In one embodiment, the configuration will allow conduits from the children to the parent, but will not allow intra-generational conduits among the children containers. Similarly, in one embodiment, two sets of conduit flags may be employed to create a select group of interconnected containers.

In response to the completion of the connection request, communication across the first and second containers is established in a shared namespace (332). In one embodiment, the established connection is considered a tunnel between the containers. Accordingly, multiple flags are established with the configuration of each container, with the respective isolated namespace of each container on a shared file system, and are employed to establish a conduit to support cross container communication.

Containers run applications in their namespaces. A memory and state snapshot of containers may be taken which can then be re-instantiated on another physical system. This process moves the tasks within a container from one system to another. It should be noted that there must be complete isolation from all resources outside of the container in order to move tasks within a container to another system, i.e. to a target system. A namespace tunnel, as described in this invention, shares objects or resources between containers. Therefore, one cannot take a snapshot ('checkpoint') of the container that can then be replicated on another system unless both the endpoints of the tunnel are checkpointed together and the state transferred, or the tunnel must be broken. Accordingly, in order to replicate a container on another physical system, the ends points of the tunnel must be checkpointed and migrated.

Therefore, whenever a tunnel is created, the fact is associated with the tasks using the tunnels endpoints. When the container is to be checkpointed, the kernel checks whether the tunnel is in use. If it is reported that the tunnel is in use, an error is returned. This response may be used to either terminate the tunnel and then checkpoint the container, or the checkpoint is failed. In another embodiment, management software may keep track of the tunnels across containers. At the same time, the management software may be employed to terminate the tunnel when necessary. The management software may also migrate the containers to a target system, including the two endpoints of the tunnel. On the target system the container is restarted from the checkpointed state. On restarting the container on the target system an error is returned if the remote endpoint of the tunnel is outside of the container and is not present. This error may be used to re-create the tunnel.

Figure 4:
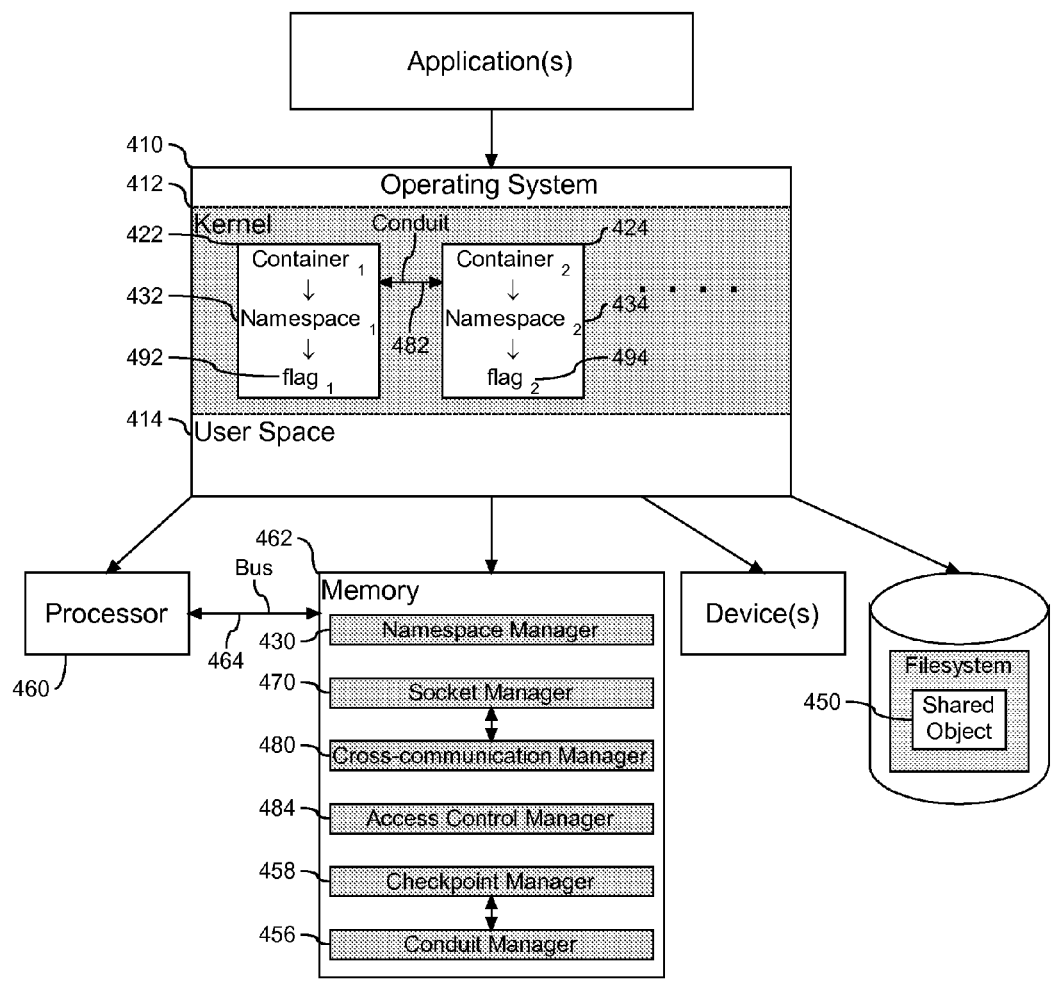
FIG. 4 is a block diagram illustrating a set of tools to manage sharing of resources across isolated containers of a computer system according to the preferred embodiment of this invention, and is suggested for printing on the first page of the issued patent.

FIG. 4 is a block diagram (400) illustrating a set of tools for managing sharing of resources across isolated containers of a computer system. As shown, a computer system is provided with an operating system (410) having both kernel space (412) and user space (414). The kernel space (412) is configured with two containers (422) and (424). In one embodiment, the kernel space may be configured with additional containers. However, for illustrative purposes only two containers are shown and described. A namespace manager (430) is shown in communication with the containers (422) and (424). More specifically, the namespace manager (430) assigns a first namespace (432) to the first container (422) and a second namespace (434) to the second container (424). The first namespace (432) is isolated from the second namespace (434), and at the same time the first and second namespace (432) and (434), respectively, have at least one shared object (450).

The computer system also includes a processor chip (460) coupled to memory (462) by a bus structure (464), and in communication with the operating system (410). Although only one processor chip (460) is shown, in one embodiment, more processor chips may be provided in an expanded design. The system is further configured with a set of tools to share resource across isolated containers of the operating system. A socket manager (470) is provided to create a socket in either one of the first or second namespaces (432), (434), respectively. In addition, a cross communication manager (480) is provided in communication with the socket manager (470). The cross communication manager (480) serves to create a conduit (482) between the first and second containers (422), (424), respectively. The conduit (482) is formed across a boundary between the first and second namespaces (432), (434), respectively, by a connection of the containers that does not have a socket with a connection to the container with the socket. The conduit (482) supports access to one or more shared resources between the first and second containers (422), (424), respectively.

In addition to creating the conduit, an access control manager (484) may be provided in communication with the cross communication manager (480) with the access control manager (484) to manage and control policies employed across the boundaries of the containers (422) and (424). Tools employed by the access control manager (484) include, but are not limited to, a flag associated with each namespace. As shown herein, a first flag (492) is associated with the first namespace (432) and a second flag (494) is associated with the second namespace (434). Both the first and second flags (492), (494), respectively, function as access control protocols across boundaries of the containers (422) and (424). In one embodiment, a match of the first and second flags (492) and (494), respectively, serves as a requirement to form the conduit (482) between the containers (422) and (424). Additionally, a checkpoint manager (458) may be provided as a secondary tool for the conduit (482) to maintain an active state thereof. In one embodiment, each of the containers has a separate connection to the conduit. The checkpoint manager (458) maintains the separate connections of each container to the conduit (482). Finally, in addition to the checkpoint manager (458), a conduit manager (456) is provided to modify the state of a conduit that is not in constant use. More specifically, the conduit manager (456) is provided in communication with the checkpoint manager (458) and manages to set a state of the conduit to hibernate without removing the conduit itself. In one embodiment, a conduit in a hibernate state makes the conduit unavailable on a temporary basis. Accordingly, the managers may be implemented as a software tool or a hardware tool to manage cross communication of isolated containers.

In one embodiment, the tool, including the managers therein, is implemented in software, which includes but is not limited to firmware, resident software, microcode, etc. The software implementation can take the form of a computer program product accessible from a computer-useable or computer-readable medium providing program code for use by or in connection with a computer or any instruction execution system. The invention can take the form of a computer program product accessible from a computer usable or computer readable medium providing program code for use by or in connection with a computer or any instruction execution system. For the purposes of this description, a computer usable or computer readable medium can be any apparatus that can contain or store the program for use by or in connection with the instruction execution system, apparatus, or device.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

The creation of the conduit(s) across the namespace maintains the consistency of the namespace view while also maintaining the isolation of the namespaces. The formation of the conduit exploits a semantic inconsistency in the isolation of the namespace to support sharing of resources between containers. More specifically, the shared property of the shared namespace is inherited into the isolated namespace. The socket is in the networking namespace and cannot communicate. However, in some operating systems, such as the UNIX operating system, sockets are also visible in the filesystem namespace, which is conventionally a shared namespace. Therefore, the first socket is present in the filesystem and networking namespaces in one container, and in the second container a second socket is created to communicate with the first socket in the networking domain by finding it in the file system domain. This communication connection is supported because the namespace is shared.

Alternative Embodiments

It will be appreciated that, although specific embodiments of the invention have been described herein for purposes of illustration, various modifications may be made without departing from the spirit and scope of the invention. In particular, the formation of the conduit is based on the shared filesystem access by the namespaces. However, in one embodiment other namespace fault lines could be discovered and employed for the formation of the conduit(s). Accordingly, the scope of protection of this invention is limited only by the following claims and their equivalents.

I claim:

1. A computer system comprising:
an operating system having a kernel level and a user level;
the kernel level configured with at least a first container and a second container;
a namespace manager to assign a first set of namespaces to the first container and to assign a second set of namespaces to the second container, the first and second containers having a partially shared file system, wherein the first namespace set is isolated from the second namespace set, with at least one shared object accessible across a shared namespace;
a socket manager to create a socket at the kernel level in the shared namespace of the at least one shared object;
a permission mechanism to create a conduit between the containers based on a permission setting in one of the first and second containers, wherein the conduit is formed across a boundary between the first and second namespace by a connection of the containers; and
a direction mechanism to control direction of the created conduit based on a match setting between the containers.

2. The system of claim 1, further comprising the conduit to support access to shared resources between the first and second containers.

3. The system of claim 1, wherein the permission mechanism employs a flag, including assignment of a first flag to the first namespace and a second flag to the second namespace, each of the flags to function as access control protocols across boundaries of the containers.

4. The system of claim 3, further comprising a match of the first and second flag as a requirement to form the conduit between the containers.

5. The system of claim 3, further comprising a checkpoint mechanism on a first connection between the first container and the conduit and on a second connection between the second container and the conduit, the checkpoint mechanism to maintain an active state of the conduit.

6. The system of claim 5, further comprising a conduit manager to set a state of the conduit to hibernate, wherein access to the conduit by one of the containers is temporarily unavailable.

7. An article comprising:
a computer system with an operating system in communication with shared resources, and at least a first container and a second container configured within the kernel level of the operating system;
a computer-readable device including computer program instructions to manage cross container communication, the instructions comprising:
instructions to assign the first container to a first set of namespaces and to assign the second container to a second set of namespaces, the first and second containers having a shared file system, wherein the first namespace set is isolated from the second namespace set, and one of the first and second namespaces having at least one shared object accessible across the shared namespace;
instructions to support a communication across a boundary of the first and second containers, the support instructions to include creation of a socket at the kernel level in the shared namespace of the shared object; and
instructions to support creation of a conduit between the containers based on a permission setting one of the containers, the conduit formed across the boundary through a connection of the containers, with the conduit to support access between the containers to shared resources; and
instructions to control direction of the conduit based on a match setting between the containers.

8. The article of claim 7, wherein the instructions to support creation of a conduit assign a first flag to the first namespace and to assign a second flag to a second namespace, with each of the first and second flags to function as an access control protocol across boundaries of the containers.

9. The article of claim 8, further comprising instructions to require a match of the first and second flags for connection between the containers.

10. The article of claim 8, further comprising instructions to maintain an active state of the conduit, including a checkpoint instruction on a first connection between the first container and the conduit and a second connection between the second container and the conduit.

11. The article of claim 10, further comprising instructions to place the conduit into a hibernation state and to return an error message from the checkpoint instructions to one of the containers requesting access across the conduit in response to the hibernation state of the conduit.

12. The article of claim 10, further comprising instructions to restart the conduit from the hibernation state.

* * * * *